United States Patent
Albisu Iso et al.

(10) Patent No.: US 12,352,238 B2
(45) Date of Patent: Jul. 8, 2025

(54) DETERMINATION OF A STATE OF A WIND TURBINE BLADE

(71) Applicant: General Electric Renovables Espana, S.L., Barcelona (ES)

(72) Inventors: Efren Albisu Iso, Barcelona (ES); Mauro Grammatico, Barcelona (ES); Pedro Arroyo Beltri, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 54 days.

(21) Appl. No.: 18/364,592

(22) Filed: Aug. 3, 2023

(65) Prior Publication Data
US 2024/0044314 A1  Feb. 8, 2024

(30) Foreign Application Priority Data
Aug. 5, 2022  (EP) ..................................... 22382763

(51) Int. Cl.
*F03D 17/00* (2016.01)
(52) U.S. Cl.
CPC .......... *F03D 17/011* (2023.08); *F03D 17/017* (2023.08); *F05B 2270/331* (2013.01)
(58) Field of Classification Search
CPC .... F03D 17/011; F03D 17/017; F03D 17/028; F03D 80/405; F03D 17/00; F03D 7/042; F05B 2270/331; F05B 2270/808; Y02E 10/72
See application file for complete search history.

(56) References Cited

U.S. PATENT DOCUMENTS

| | | | |
|---|---|---|---|
| 6,890,152 B1 * | 5/2005 | Thisted | F03D 80/40 416/41 |
| 7,086,834 B2 * | 8/2006 | LeMieux | F03D 7/02 416/37 |
| 7,883,319 B2 * | 2/2011 | Volkmer | G01H 1/006 416/61 |
| 8,704,390 B2 * | 4/2014 | Haj-Maharsi | F03D 9/257 290/43 |
| 9,133,828 B2 * | 9/2015 | Egedal | F03D 80/40 |
| 9,353,727 B2 * | 5/2016 | Slot | F03D 1/065 |

(Continued)

FOREIGN PATENT DOCUMENTS

| | | |
|---|---|---|
| DE | 102020118646 A1 | 1/2022 |
| EP | 2565444 A1 | 3/2013 |
| EP | 3009673 A1 | 4/2016 |

OTHER PUBLICATIONS

European Search Report Corresponding to EP22382763 on Jan. 13, 2023.

*Primary Examiner* — Pedro J Cuevas
(74) *Attorney, Agent, or Firm* — Dority & Manning, P.A.

(57) ABSTRACT

The present disclosure is related to methods (400; 500; 600) configured for detecting the state of a wind turbine blade (22). The methods (400; 500; 600) comprising receiving (401; 501) load signals from a wind turbine blade (22), determining (402; 503) an energy of the load signal in a first and second frequency and comparing (403; 504) said energy to generate a flag signal if the energy in the first frequency is smaller than the energy in the second frequency. A control system (600) suitable to detect the state of a wind turbine blade (22) is also provided, as well as wind turbines (10) including such a control system (600).

17 Claims, 6 Drawing Sheets

(56) References Cited

U.S. PATENT DOCUMENTS

| | | | | |
|---|---|---|---|---|
| 9,926,912 B2* | 3/2018 | Deshpande | | F03D 7/048 |
| 10,422,321 B2* | 9/2019 | Müller | | F03D 17/00 |
| 10,466,205 B2* | 11/2019 | Brenner | | G01N 29/12 |
| 10,718,316 B2* | 7/2020 | Müller | | F03D 80/40 |
| 10,767,633 B2* | 9/2020 | Narayanan | | F03D 7/0224 |
| 10,865,778 B2* | 12/2020 | Müller | | F03D 17/00 |
| 10,876,518 B2* | 12/2020 | Rizzo | | F03D 1/06 |
| 11,384,738 B2* | 7/2022 | Nielsen | | F03D 17/00 |
| 11,649,804 B2* | 5/2023 | Shartzer | | F03D 17/00 |
| | | | | 290/44 |
| 11,703,035 B2* | 7/2023 | Arlaban Gabeiras | | |
| | | | | F03D 7/0224 |
| | | | | 416/1 |
| 2009/0246019 A1* | 10/2009 | Volanthen | | F03D 80/40 |
| | | | | 416/61 |
| 2010/0158688 A1* | 6/2010 | Benito | | F03D 80/40 |
| | | | | 416/61 |
| 2010/0189560 A1* | 7/2010 | Haraguchi | | F03D 80/40 |
| | | | | 416/1 |
| 2010/0209243 A1* | 8/2010 | Birkemose | | F03D 17/00 |
| | | | | 416/61 |
| 2012/0139241 A1* | 6/2012 | Haj-Maharsi | | F03D 9/257 |
| | | | | 290/44 |
| 2012/0173172 A1* | 7/2012 | Laurberg | | G01H 1/006 |
| | | | | 702/56 |
| 2012/0175878 A1* | 7/2012 | Wickstrom | | F03D 80/40 |
| | | | | 290/44 |
| 2012/0253697 A1* | 10/2012 | Frankenstein | | G05B 23/0254 |
| | | | | 702/39 |
| 2012/0292905 A1* | 11/2012 | Slot | | F03D 1/065 |
| | | | | 290/55 |
| 2013/0136594 A1* | 5/2013 | Casazza | | F03D 17/00 |
| | | | | 416/1 |
| 2013/0195657 A1 | 8/2013 | Lauritsen et al. | | |
| 2013/0272874 A1* | 10/2013 | Hess | | F03D 17/00 |
| | | | | 416/61 |
| 2015/0000404 A1* | 1/2015 | Brenner | | G01N 29/12 |
| | | | | 73/579 |
| 2015/0110624 A1* | 4/2015 | Zhou | | F03D 7/043 |
| | | | | 416/1 |
| 2016/0356266 A1* | 12/2016 | Koerber | | F03D 7/044 |
| 2017/0226990 A1* | 8/2017 | Arlaban Gabeiras | | F03D 1/06 |
| 2017/0335828 A1* | 11/2017 | Müller | | F03D 17/00 |
| 2018/0058425 A1* | 3/2018 | Deshpande | | F03D 9/257 |
| 2020/0325875 A1* | 10/2020 | Rizzo | | F03D 1/06 |
| 2021/0317818 A1* | 10/2021 | Perrone | | F03D 7/042 |
| 2022/0220936 A1* | 7/2022 | Thomsen | | F03D 7/0296 |
| 2022/0389906 A1* | 12/2022 | Shartzer | | F03D 7/048 |
| 2022/0412307 A1* | 12/2022 | Leonardi | | F03D 7/028 |
| 2024/0254964 A1* | 8/2024 | Giles | | F03D 7/024 |

* cited by examiner

DETERMINATION OF A STATE OF A WIND TURBINE BLADE

FIELD

The present disclosure relates to wind turbines, and to methods for operating wind turbines. The present disclosure more particularly relates to methods and systems for detecting a state of a wind turbine blade, and more particularly a variation in the state of a wind turbine blade due to e.g. ice accumulation.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

Modern wind turbines have increasingly larger rotor diameters to capture more energy throughout their lifetime and reduce the cost of energy. As the rotor size increases, the stiffness of the blades is not proportionally increased, leading to more flexible blades that are more sensitive to dynamic perturbations. Said dynamic perturbations may lead to edgewise and spanwise oscillations.

Wind turbines that are installed in cold climates require additional consideration in terms of design and safety. Icing has been recognized as an obstacle in the optimal harvesting of wind resources in cold regions. At lower temperatures, ice accretion may occur on wind turbine components. In fact, ice accretion on wind turbine blades affects the aerodynamic efficiency of the blades and thus the power output and leads to higher loads and may be a hazard for the whole wind turbine. Ice formation affects the structural behavior and fatigue life of the blade(s) as well. Further, blade imbalance may occur as a result of ice growing on the blade: even if the root end of wind turbine blade may be free from ice, ice may accumulate at the tip end of the wind turbine blade. This occurs due to the higher relative velocity between the wind turbine blade tip and atmospheric water droplets, and also due to the larger atmospheric swept area of wind turbine blade tip portions, among others. Thus, uneven ice accretion on wind turbine blades may also cause blade imbalance during rotation, posing severe risks for the operation of the wind turbine.

The accumulation of ice in wind turbine blades may also result in chunks of ice detaching from the wind turbine blades during operation (or during parked conditions). Falling chunks of ice may impact against other parts of the wind turbine structure and can pose a risk for operators working in the vicinity of the wind turbine.

It is known to utilize ice detection systems, e.g. based on cameras to try to detect the presence of ice on the blades. It is also known to interrupt operation and carry out certain tests (like imbalance tests) to try to detect ice on one or more of the blades.

The present disclosure provides methods and systems to detect a variation in the dynamic response of a wind turbine blade, in particular due to ice accumulation, to at least partially overcome some of the aforementioned drawbacks.

SUMMARY

In an aspect of the present disclosure, a method for detecting a state of a wind turbine blade is provided. The method comprises receiving one or more load signals from one or more sensors configured to measure loads on the wind turbine blade. Further, the method comprises determining an energy of the load signals at a first frequency, and determining an energy of the load signals at a second frequency, wherein the first frequency is a frequency substantially corresponding to a natural frequency of the blade in a default state. The method also comprises comparing the energy of the load signals at the first frequency to the energy of the load signals at the second frequency. Additionally, the method comprises generating a flag signal if the energy of the load signals at the first frequency is smaller than the energy of the load signals at the second frequency.

According to this aspect, the state of a wind turbine blade can be detected based on a shift or modulation of the energy of a load signal, i.e. from one frequency (band) to another frequency (band). This results in a method that allows determining the state of a wind turbine blade during wind turbine operation and without installing additional devices, i.e. cameras or others. Thus, this method allows monitoring the state of a wind turbine blade without affecting the overall power output of the wind turbine.

Throughout this disclosure, the term "load signal" should be understood as a signal that is at least partially representative of an acting load. Thus, a load signal may be, for example, a signal indicating a movement or deformation, a signal comprising acceleration values, a signal comprising force or stress readings or any other magnitude that may be used to estimate a load acting on said component or on another component mechanically connected to the former.

The "default state" may herein be regarded as a reference state of a wind turbine blade, i.e. situation or state to which a comparison is to be made. The default state may be an "ideal" state of the wind turbine blade, i.e. a clean, as delivered, blade without any deterioration of the blade or any accumulation or accretion of ice or other matter. The default state may however be chosen differently.

When reference is made throughout the present disclosure to determining an "energy" or "energy content" of a signal, this is herein to be regarded as the determination (calculation or estimation) of any indicator known in the art to indicate energy, in particular including using the square of the signal magnitude, Root Mean Square (RMS) of a signal, the envelope of squared signal magnitude or the integral of squared signal magnitude. The energy or energy content of a signal can be calculated or estimated for a finite period of time. It is noted that signal energy is not necessarily actually a measure of "energy" as understood in physics.

Additional objects, advantages and features of embodiments of the present disclosure will become apparent to those skilled in the art upon examination of the description, or may be learned by practice.

DETAILED DESCRIPTION OF EXAMPLES

Figure 1:
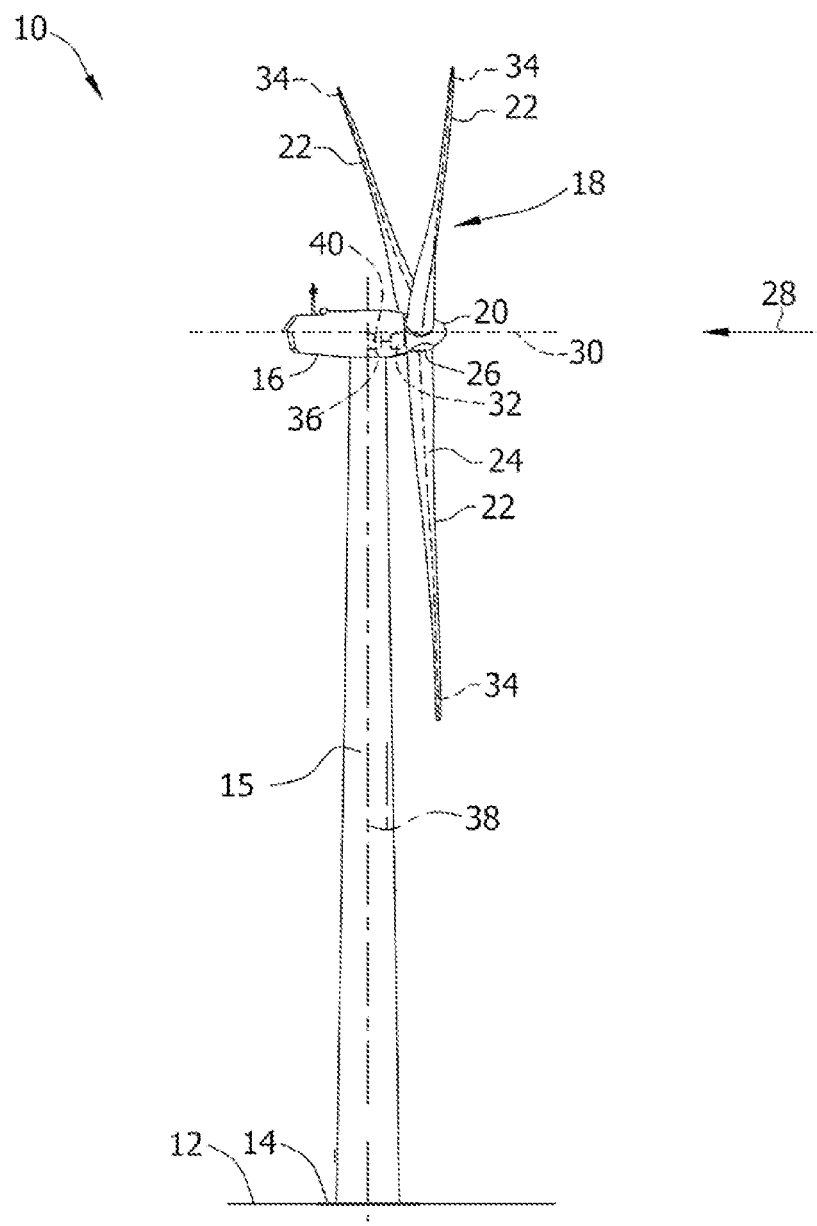
FIG. 1 schematically illustrates a perspective view of one example of a wind turbine.

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
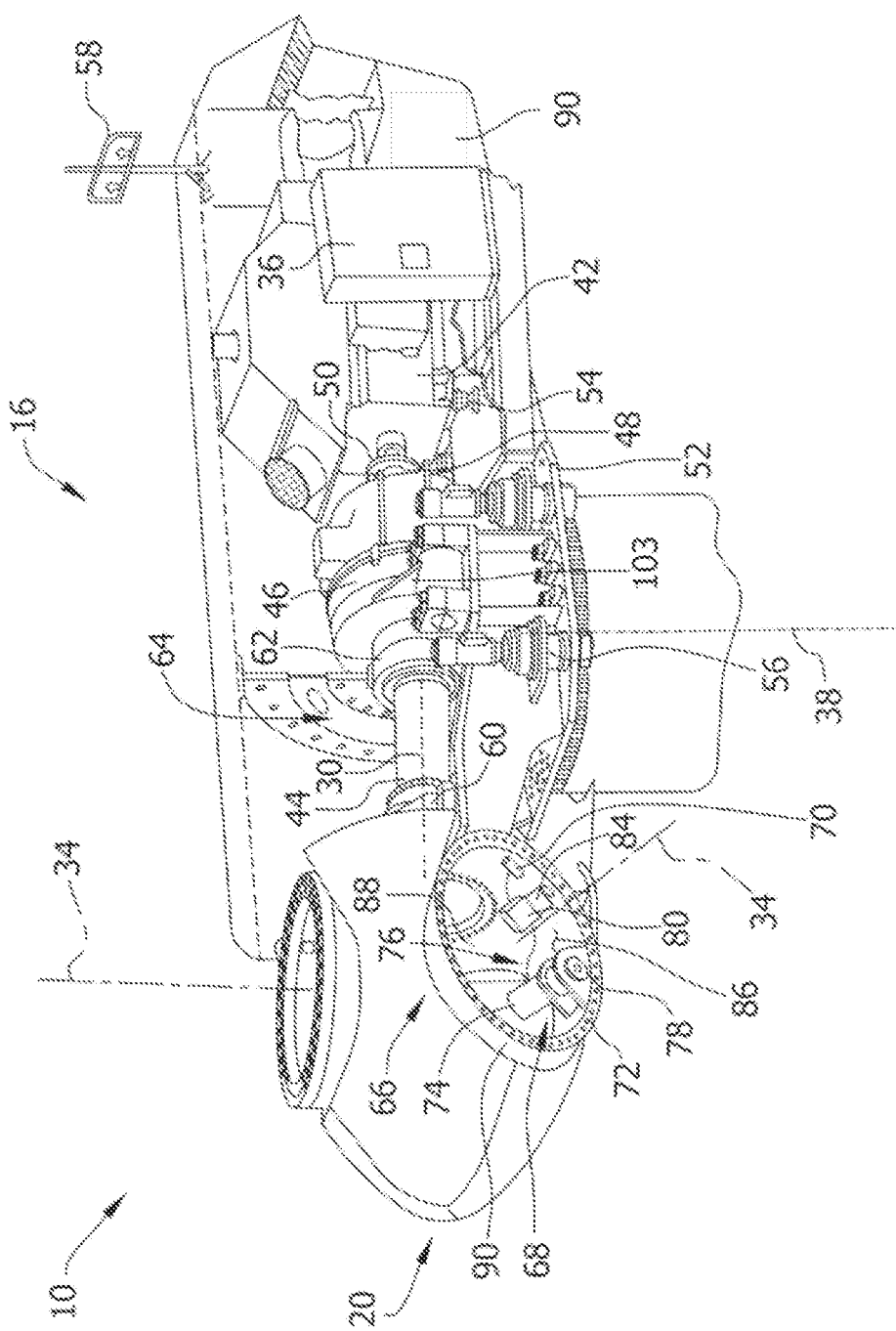
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
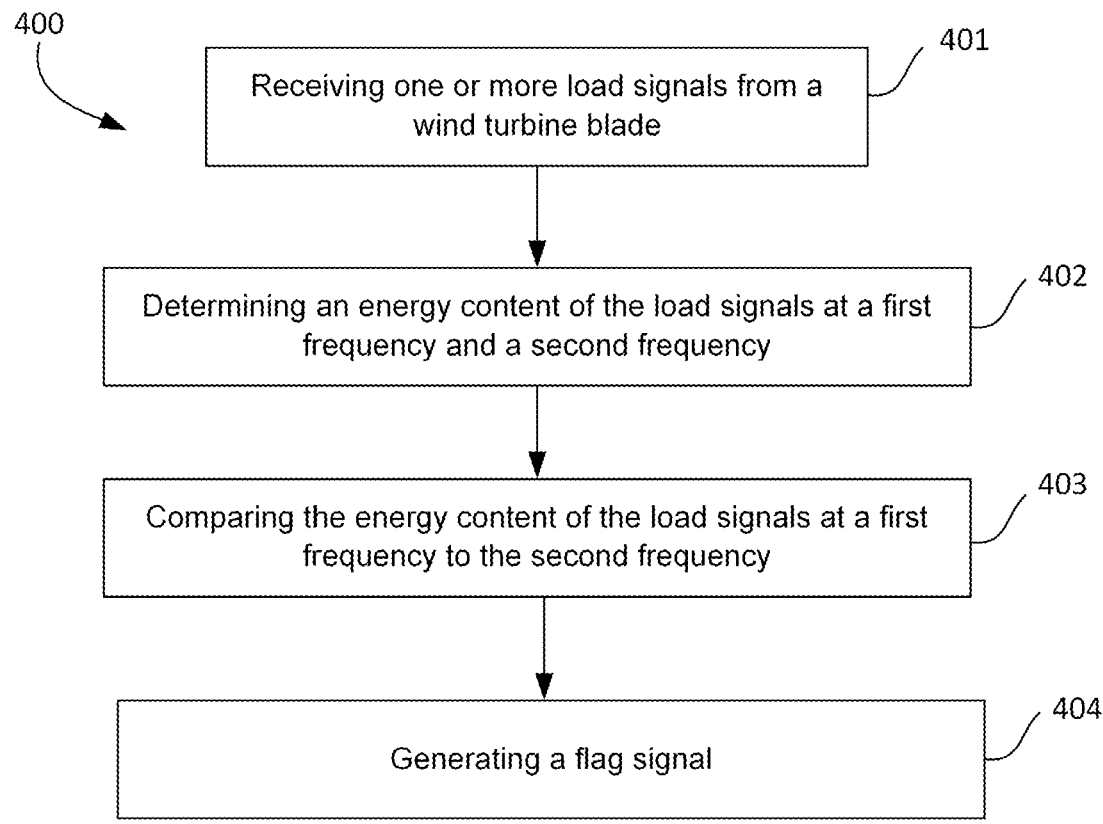
FIG. 3 shows a flowchart of an example of a method for detecting a state of a wind turbine blade according to a first aspect of the present disclosure.

FIG. 3 shows a flowchart of an example of a method 400 for detecting a state of a wind turbine blade according to a first aspect of the present disclosure. The method 400 in FIG. 3 comprises, at block 401, receiving one or more load signals from one or more sensors configured to measure loads on the wind turbine blade. The method 400 also comprises, at block 402, determining an energy of the load signals at a first frequency, and determining an energy of the load signals at a second frequency, wherein the first frequency is a frequency substantially corresponding to a natural frequency of the blade in a default state. The method 400, at block 403, comprises comparing the energy of the load signals at the first frequency to the energy of the load signals at the second frequency. Further, the method 400, at block 404, comprises generating a flag signal if the energy of the load signals at the first frequency is smaller than the energy of the load signals at the second frequency.

As previously discussed, method 400 can detect the state of a wind turbine blade based on a shift or modulation of the energy of a load signal, i.e. from one frequency (band) to another frequency (band). Thus, method 400 can estimate in a precise and robust manner the state of a wind turbine blade from the load signals received. Further, method 400 allows determining the state of a wind turbine blade during wind turbine operation and without affecting the overall power output of the wind turbine. Additionally, method 400 can be performed by devices generally already included in a wind turbine, and therefore, does not require the installation of additional devices in the wind turbine. Further details regarding method 400 and further examples will be discussed in relation to FIGS. 4 and 5.

The first and second frequencies may be chosen in accordance with the phenomenon to be detected. The default state of the blade may correspond to an ideal state of the blade, in which the blade is clean and has no external mass accumulation. And the first frequency may be selected to correspond to a natural frequency of the blade in this default state, i.e. with any mass accumulation (through ice, dirt or otherwise). The second frequency, in examples, may be chosen to substantially correspond to a natural frequency of the wind turbine blade with ice accumulation. The second frequency may be chosen to correspond to a natural frequency of the wind turbine blade with an accumulation of ice above a specified threshold.

Figure 4:
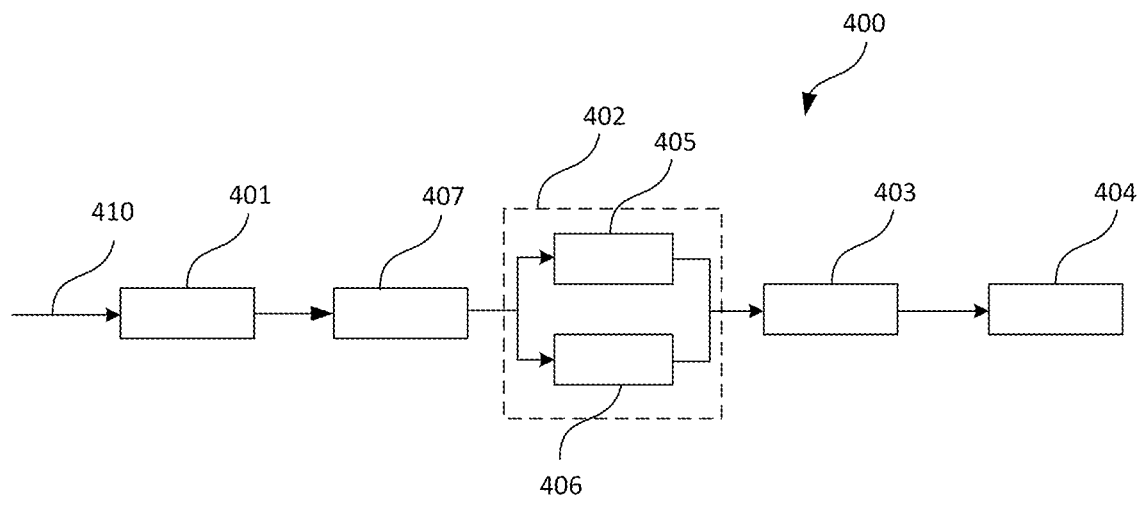
FIG. 4 shows a flowchart of another example of the method in FIG. 3.

FIG. 4 shows a flowchart of another example of method 400 for detecting a state of a wind turbine blade 22.

In the illustrated example in FIG. 4, the method 400 may comprise receiving load signals 410 representative of edgewise loads acting on the wind turbine blade at block 401. The load signals may e.g. be received from strain gauges. It has been found that using edgewise loads can increase reliability of the determination of the state of the blades, since they are subjected to less aerodynamic damping. Other types of load signals may also be received and treated according to method 400, such as for example load signals representative of flapwise loads.

Further, the method 400 may comprise, before block 402, filtering 407 the signals 410 representative of loads acting on the wind turbine blade 22 with rotor rotational speed. The rotor frequency (associated with rotor rotational speed) should be understood as the frequency at which the rotor hub 20 rotates. This frequency is also referred in the art as 1P frequency.

In examples, a notch filter may be used to filter the signals representative of loads with rotor frequency (1P). This filtering may be carried out prior to determining the energy at the different frequencies. In other examples, the filtering 407 step may comprise using other filtering methods such as a high-pass filter with a cut-off frequency that substantially corresponds to the rotor frequency (1P) or the blade-passing frequency, referred in the art as 3P frequency.

This filtering 407 step substantially removing at least loads with 1P frequency allows mitigating the contribution of the blades 22 passing the wind turbine tower 15 in the energy of the load signal 410. Thus, the subsequent steps of method 400 may provide a more precise estimation of the change in the energy of the signal 410 at different frequency bands.

Additionally, method 400 may comprise a further filtering step (not illustrated in FIG. 4), wherein high frequency content from load signals 410 is filtered. This filtering step may comprise using a smoothing filter that may be applied to a signal 410 in the time domain or in the frequency domain. The smoothing filtering may be a moving average filter, a weighted moving average filter such as a binomial, exponential or polynomial weighted moving average filter, a median filter, or others. Further, the filtering step may comprise resampling the load signals 410 before applying a smoothing filter. The filtering step may also comprise a step of outlier removal. Additionally, filtering approaches combining outlier removal and smoothing may be also applied, as for example a Hampel filter.

As can be seen in the example method 400 of FIG. 4, block 402 may comprise a first sub step 405 of determining an energy of the load signals 410 at a first frequency 421, and a second sub step 406 of determining an energy of the load signals 410 at a second frequency 422. The sub steps 405, 406 may be performed sequentially (in any order) or in parallel, depending for example on computing power available.

A band pass filter may be applied to determine the load signals at the first and second frequencies. A band-pass filter or bandpass filter (BPF) may herein be regarded as a filter that passes frequencies within a certain range and rejects (attenuates) frequencies outside that range. Therefore the load signals at the first frequency and at the second frequency may not necessarily correspond exactly to the load signals at that frequency only, but instead may include a small (narrow) frequency band around the first frequency and a small frequency band around the second frequency. These small frequency bands may also be referred to as "passband".

In examples, the energy may be determined by computing the root-mean-square (RMS) of the load signals. At sub-steps 405, 406, the load signals at the first and second frequencies (and passbands) may be determined. Then the RMS of these signals over a period of time may be calculated. The period of time may be selected appropriately in order to be able to determine the appearance of the phenomenon that is to be detected. In examples, the period of time may be chosen to be between 1 minute (including at least a few revolutions of the wind turbine rotor) and 15 minutes, specifically between 3 minutes and 10 minutes. Other approaches than RMS to determine or estimate the energy of the load signals as mentioned before may be used. Also other time periods may be used.

In examples, the order of certain steps of method 400 may be altered. For example, it may be possible to receive load signals while the method 400 is determining an energy of a previously received load signal, i.e. some steps of method 400 may overlap between different loops of method 400. And it is not necessary for one step to finish before another step starts.

In some examples, the natural frequency of the blade 22 at the first frequency 421 of sub step 405 may be the natural frequency of a first normal mode or of a second normal mode of the blade 22 in a default state.

A normal mode of an oscillating system is a pattern of motion in which all parts of the system move sinusoidally with the same frequency and with a fixed phase relation. The free motion described by the normal modes takes place at fixed frequencies. These fixed frequencies of the normal modes of a system are known as its natural frequencies or resonant frequencies. The first natural frequency and first normal mode refer to the lowest resonant frequency for the wind turbine and the oscillation mode corresponding to this frequency. The second normal mode and corresponding second natural frequency refer to the second lowest resonant frequency and corresponding oscillation mode.

In examples, the second frequency 422 of sub step 406 may comprise a frequency mode of the wind turbine blade 22 with an accumulation of ice above an allowable threshold. Additionally, the second frequency 422 may be obtained through wind turbine blade simulations or through field data.

In some examples, the allowable threshold may represent an accumulation of ice between 3% and 5% of the mass of the blade. In other examples, the allowable threshold may represent a lower or higher accumulation of ice relative to the mass of the wind turbine blade 22. The value of the allowable threshold may at least partially depend on mechanical properties of the blade and on the dynamical response of the blade. The level of the threshold may further depend on the type of flag signal generated.

As illustrated in FIG. 4, the example method 400 may comprise at block 403 the comparison of the energy of the signals at the first and second frequencies. Depending on the result, a flag signal may or may not be generated at block 404.

In examples, the flag signal generated at block 404 may comprise a command enable a de-icing system of the wind turbine. Further, the flag signal may comprise a command to stop a wind turbine operation. In other examples, the flag signal may comprise other commands to alert of an incipient accumulation of ice in a wind turbine blade 22 or another structural change in the wind turbine blade, e.g. a structural degradation. This may allow carrying out a maintenance task of the wind turbine blade 22 before accumulation of ice poses a risk for the normal operation of the wind turbine 10. In examples, multiple thresholds (and more than two frequencies) with corresponding different flag signals may be used.

In some examples, the flag signal may be a signal to derate the wind turbine i.e. power output and/or rotational speed of the wind turbine are reduced in order to reduce loads on the blades. It may happen that such a flag signal is generated in the morning but that temperature rises during the day and this causes the ice to fall off or melt from the blades. With examples of methods and systems of the present disclosure, the determination may be made that the blade appears to have returned to its default state or clean state without ice accumulation (or at least to a significant extent), so that normal operation of the wind turbine can be resumed.

Similarly, if a de-icing operation is carried out, methods and systems of the present disclosure can help to confirm that ice has indeed been removed from the blades. When operation is resumed, it may be determined that the blade has returned (or at least to a significant extent) to the default or clean state. If this is not the case, a new flag signal may be generated and a further de-icing operation might be carried out.

In some examples, therefore the method may comprise deactivating the flag signal or resuming operation as before the flag signal once it has been determined that the load signal at the first frequency has more energy than the load signal at the second frequency.

Figure 5:
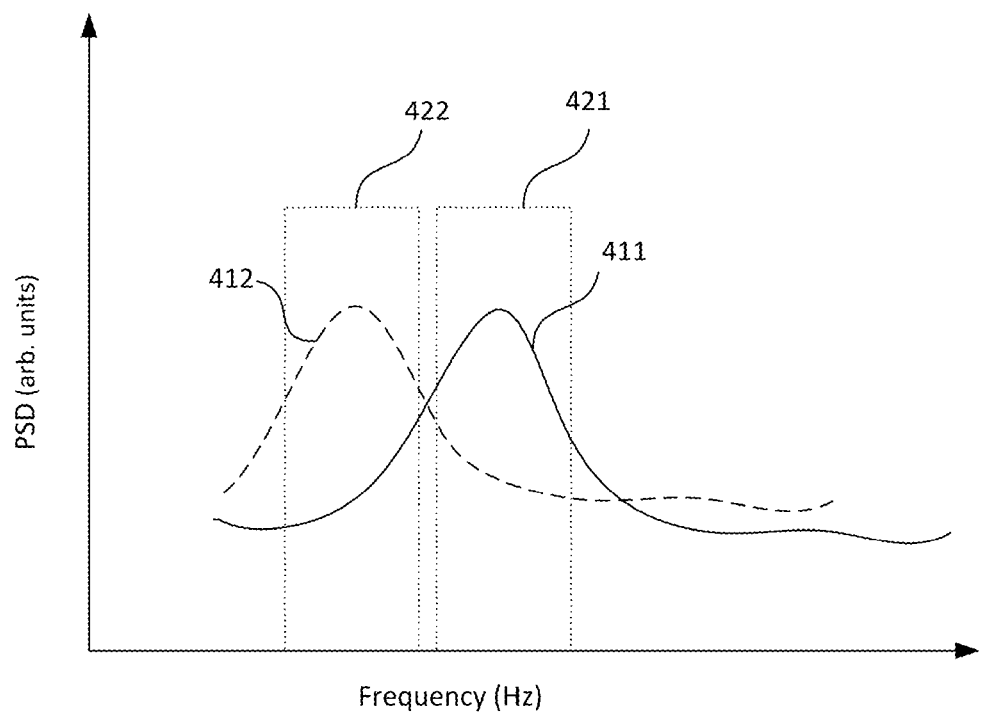
FIG. 5 shows a graph with example load signals and frequency bands.

FIGS. 5 shows a graph with example load signals 411, 412 and frequency bands 421, 422. The graph illustrates a power spectral density of the two example load signals 411, 412 of arbitrary units (displacement data, force data, acceleration data, or any other suitable data) in the frequency domain. In the graph, a first load signal 411 (illustrated with solid line) is schematically representative of a load signal from a wind turbine blade 22 in operation in a default state. Further, a second load signal 412 (illustrated with broken line) is schematically representative of a load signal from a wind turbine blade in operation wherein ice accretion has occurred. The Power Spectral Density (PSD) diagram of FIG. 5 thus serves to illustrate the phenomenon that allows detection of a deviation of the blade from a default state in examples of the present disclosure. Within the scope of the present disclosure, it is not necessary to calculate or otherwise estimate the PSD of the load signals. Calculating PSD in a substantially continuous manner during operation requires significant processing power.

As discussed in relation to method 400, a load signal 410 (not illustrated) may be treated to estimate an energy at a first frequency 421 corresponding substantially to a natural frequency of the blade in a default state. Further, the energy of the load signal 410 at a second frequency 422 may also be determined. Thus, method 400 can compare the energy of the load signal 410 at the first frequency 421 with the energy of the load signal 410 at the second frequency. In case the energy of the load signal 410 is greater at the first frequency band 421 (this means that the structural behavior of the blade corresponds substantially to its default state) than at the second frequency 422, method 400 would not generate a flag final.

As previously discussed, the second frequency (or second frequency band) 422 may be a frequency corresponding to a normal mode of the wind turbine blade when an accumulation of ice above an allowable threshold occurs, as can be observed from the peak in the power spectral density of load signal 412 at a smaller frequency value compared with load signal 411.

In examples of method 400, the first and second frequencies 421, 422 may be selected such that a sufficient separation between the frequencies (or frequency bands) exists which allows reliable determination of a distinction between one frequency and another. At the same time, the frequencies may be selected in accordance with the flag or warning signal generated (stopping operation of the wind turbine is preferably avoided unless necessary, whereas a warning signal may be generated when the change in the blades is not very pronounced yet).

Figure 6:
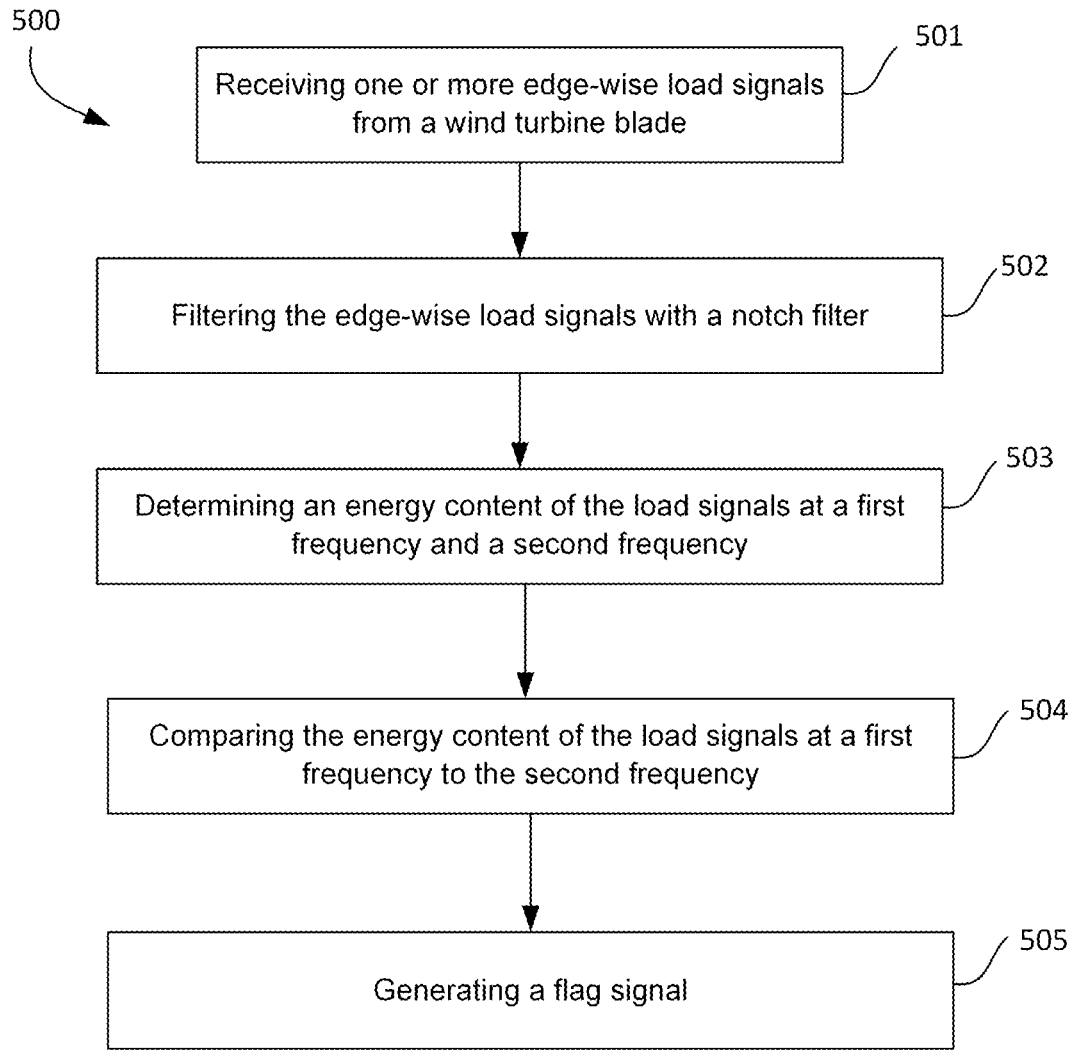
FIG. 6 shows a flowchart of an example of another method for detecting a state of a wind turbine blade according to a second aspect of the present disclosure.
Figure 7:
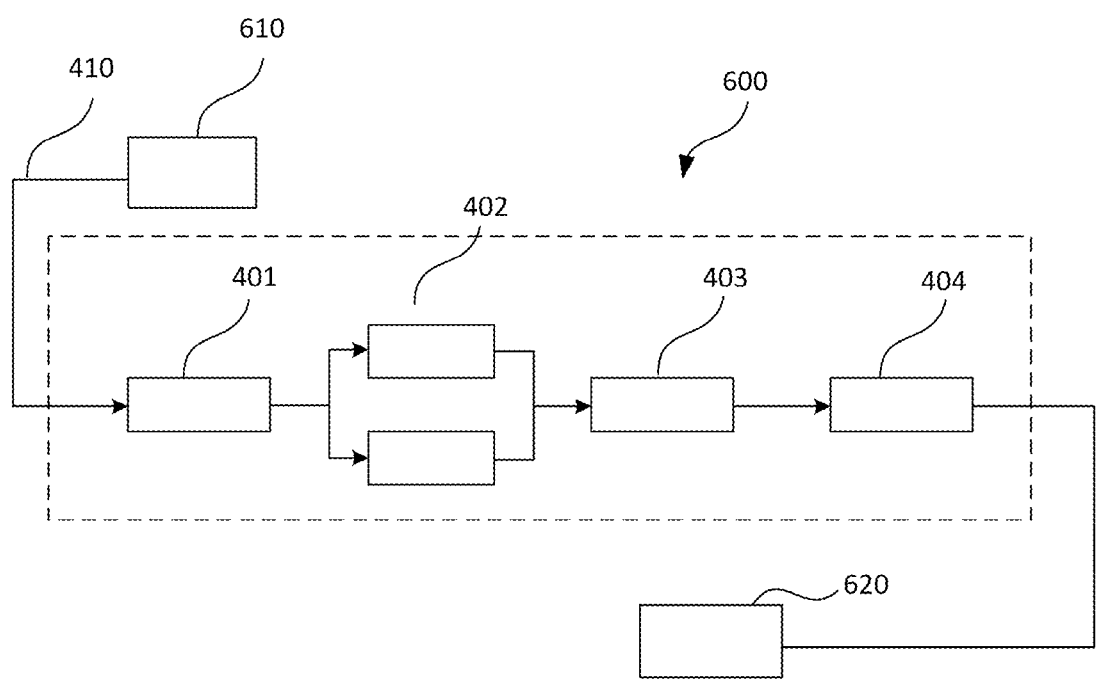
FIG. 7 schematically illustrates an example of a control system of a wind turbine according to the present disclosure.

In another aspect of the disclosure, another method 500 to detect the state of a wind turbine blade 22 is provided. Method 500 is schematically illustrated in FIG. 6.

The method 500 comprises, at block 501, receiving one or more edgewise load signals from one or more sensors 610 configured to measure edgewise loads on the wind turbine blade 22. Further, at block 502, the method 500 comprises filtering out the edgewise load signals with frequency substantially corresponding to a rotor rotational speed frequency (1P).

The method 500 further comprises, at block 503, determining an energy of the edgewise load signals at a first frequency, wherein the first frequency is a frequency substantially corresponding to a natural frequency of the blade in a default state.

Also at block 503, the method comprises determining an energy of the edgewise load signals at a second frequency. Additionally, the method 500 comprises, at block 504, comparing the energy of the edgewise load signals at the first frequency to the energy of the load signals at the second frequency. Then, at block 505, the method 500 comprises generating a flag signal if the energy of the edgewise load signals in the first frequency band is smaller than the energy of the edgewise load signals in the second frequency band.

Thus, the method 500 allows determining the state of a wind turbine blade based on load signals representative of edgewise oscillations in the blade. Since edgewise oscillations are not subjected to severe aerodynamic damping, the method 500 may accurately detect changes in the state condition of the wind turbine blade in a precise and reliable manner.

In yet another aspect of the present disclosure, a control system 600 for a wind turbine 10 is provided. The control system 600 comprises a processor and a non-volatile memory. The memory comprises instructions which, when executed by the processor, cause the control system 600 to perform a set of operations. One operation comprises receiving 401 one or more load signals 410 from one or more sensors 610 configured to measure loads on the wind turbine blade. Another operation comprises determining 402 an energy of the load signals 410 in a first frequency band and a second frequency band, wherein the first frequency band is a frequency band comprising a natural frequency of the blade in a default state. Yet another operation comprises comparing 403 the energy of the load signals 410 in the first frequency band to the energy of the load signals 410 in the second frequency band. Further, another operation performed by the processor comprises generating 404 a flag signal if the energy of the load signals 410 in the first frequency band is smaller than the energy of the load signals 410 in the second frequency band.

In some examples, the memory of the control system 600 may further comprise load data of the wind turbine blade. This load data may comprise data from wind turbine blade (s) during normal operation in a default state, data from the wind turbine blade during operation under the influence of different amount of ice accumulation, or others. Further, the load data may be predefined data corresponding to loads occurring when an accumulation of ice above an allowable threshold occurs. For example, the load data may be recorded load date, i.e. experimentally recorded under controlled conditions, or load data from wind turbine blade simulations. The load data may be used by the processor to define the first and second frequency bands among others. The load data may include data on the natural frequencies of the blade(s) in different circumstances, e.g. different amounts of ice accretion.

In a further aspect of the disclosure, a wind turbine 10 comprising a plurality of blades and a control system 600 as previously disclosed is provided. Further, the wind turbine 10 may comprise sensors 610 configured to measure loads on the wind turbine blades. More specifically, the sensors 610 may be strain gauges mounted on the blades. Additionally, in some examples, the sensors 610 are configured to provide edgewise loads acting on the blade(s).

In examples, the wind turbine 10 may further comprise a communication unit 620 configured to send the flag signal to a local wind turbine controller, to a SCADA system or to a Remote Operating Center. In other examples, the control system 600 may form part of the local wind turbine controller.

It is noted that all features of the control system 600 can be included in methods 400, 500 suitable for detecting a state of the wind turbine blade, and vice versa.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for detecting a state of a wind turbine blade, the method comprising:
receiving a load signal from a sensor configured to measure loads on the wind turbine blade;
determining an energy of the load signal at a first frequency, and determining an energy of the load signal at a second frequency, wherein the first frequency corresponds to a natural frequency of the wind turbine blade in a default state and the second frequency corresponds to a natural frequency of the wind turbine blade with an accumulation of ice above an allowable threshold, wherein the natural frequency of the wind turbine blade is a frequency of a first normal mode or of a second normal mode of the blade in the default state, wherein the first normal mode refers to a lowest resonant frequency and corresponding first oscillation mode, wherein the second normal mode refers to a second lowest resonant frequency and corresponding second oscillation mode;
comparing the energy of the load signal at the first frequency to the energy of the load signals at the second frequency; and
generating a flag signal when the energy of the load signal at the first frequency is smaller than the energy of the load signal at the second frequency.

2. The method of claim 1, wherein the load signal is representative of an edgewise load acting on the wind turbine blade.

3. The method of claim 1, wherein the default state of the blade corresponds to an ideal state of the blade.

4. The method of claim 1, further comprising filtering a rotor rotational speed frequency from the load signal prior to determining the energy of the load signal.

5. The method of claim 4, wherein the filtering comprises using a notch filter.

6. The method of claim 1, wherein the load signal is determined at the first and second frequencies using band-pass filters.

7. The method of claim 6, wherein the energy of the load signal at the first and second frequencies is determined by calculating a Root Mean Square of the load signal at the first and second frequencies.

8. The method of claim 1, further comprising filtering high frequency content from the load signal before determining the energy of the load signal.

9. The method of claim 8, wherein the high frequency content is filtered from the load signal using a smoothing filter.

10. The method of claim 1, further comprising filtering the load signal with an outlier detection filter before determining the energy of the load signal.

11. The method of claim 1, wherein the flag signal comprises a command to activate a de-icing system.

12. The method of claim 1, wherein the flag signal comprises a command to stop operation of the wind turbine.

13. A wind turbine, comprising:
one or more blades;
a control system comprising load data corresponding to loads occurring on the one or more blades when an accumulation of ice above an allowable threshold occurs, the control system configured to perform the following operations:
receive a load signal from one or more sensors configured to measure loads on the blades;
determine an energy of the load signal in a first frequency, and determine an energy of the load signal in a second frequency, wherein the first frequency substantially corresponds to a natural frequency of the blade in a default state and the second frequency corresponds to a natural frequency of the wind turbine blade with an accumulation of ice above an allowable threshold, wherein the natural frequency of the wind turbine blade is a frequency of a first normal mode or of a second normal mode of the blade in the default state, wherein the first normal mode refers to a lowest resonant frequency and corresponding first oscillation mode, wherein the second normal mode refers to a second lowest resonant frequency and corresponding second oscillation mode;

compare the energy of the load signal in the first frequency to the energy of the load signal in the second frequency; and generate a flag signal when the energy of the load signal in the first frequency is smaller than the energy of the load signal in the second frequency.

14. The wind turbine of claim 13, wherein the sensors comprise strain gauges mounted on the blades.

15. The wind turbine of claim 13, wherein the sensors are configured to provide signals indicative of edgewise loads acting on the blades.

16. A method for detecting a state of a wind turbine blade, the method comprising:

receiving one or more edgewise load signals from one or more sensors configured to measure edgewise loads on the wind turbine blade;

filtering out of the edgewise load signals a frequency corresponding to a rotor rotational speed frequency;

determining an energy of the filtered edgewise load signals at a first frequency, wherein the first frequency corresponds to a natural frequency of the wind turbine blade in a default state and the second frequency corresponds to a natural frequency of the wind turbine blade with an accumulation of ice above an allowable threshold, wherein the natural frequency of the wind turbine blade is a frequency of a first normal mode or of a second normal mode of the blade in the default state, wherein the first normal mode refers to a lowest resonant frequency and corresponding first oscillation mode, wherein the second normal mode refers to a second lowest resonant frequency and corresponding second oscillation mode;

comparing the energy of the load signals at the first frequency to the energy of the load signals at the second frequency; and generating a flag signal when the energy of the load signals at the first frequency is smaller than the energy of the load signals at the second frequency band.

17. The method according to claim 16, wherein determining the energy of the filtered edgewise load signals at the first and second frequencies comprises:

applying bandpass filters for the first and second frequencies to the filtered edgewise load signals; and calculating a Root Mean Square of the load signals at the first and second frequencies.

* * * * *